United States Patent
Feezell et al.

(12)

(10) Patent No.: US 6,253,189 B1
(45) Date of Patent: Jun. 26, 2001

(54) SYSTEM AND METHOD FOR COMPLETING ADVERTISING TIME SLOT TRANSACTIONS

(75) Inventors: James Thomas Feezell, Alexandria; Robert Rudelius, McLean, both of VA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/929,506

(22) Filed: Sep. 15, 1997

(51) Int. Cl.$^7$ .................................................. G06F 7/06

(52) U.S. Cl. .............................................................. 705/14

(58) Field of Search ..................................... 705/14, 26, 1

(56) References Cited

U.S. PATENT DOCUMENTS

| | | | |
|---|---|---|---|
| 5,758,328 | * 5/1998 | Giovannoli | 705/26 |
| 5,774,534 | * 6/1998 | Mayer | 379/142 |
| 5,794,210 | * 8/1998 | Goldhaber et al. | 705/14 |
| 5,826,165 | * 10/1998 | Echieta et al. | 455/2 |

FOREIGN PATENT DOCUMENTS 0 929 045  *  7/1999  (EP).

OTHER PUBLICATIONS

Jun. 9, 1995; Advalue Media Technologies; pp. 1–39.*
IEEE Transactions on Software Engineering, vol. 22, No. 5, May 1996, "The Design and Implementation of a Secure Auction Service", Matthew K. Franklin and Michael K. Reiter.

* cited by examiner

Primary Examiner—Tod Swann
Assistant Examiner—Matthew Smithers (57) ABSTRACT

An apparatus, system and method for completing advertising time slot transactions. A time slot exchange server receives an offer to sell a time slot along with time slot information relevant to making an buying decision with respect to the time slot. The time slot exchange server makes available time slot offer and marketing and valuation data to assist a buyer to identify and properly value a time slot that meets the buyer's requirements. The time slot exchange server receives time slot bids and transfers the ownership of a time slot from a seller to a buyer when a bid meets or exceeds the terms of the time slot's offer to sell. The time slot exchange server also ensures that a broadcaster has a correct copy of an advertisement to be shown in a time slot, and sends verification data to an advertiser indicating whether, when and how an advertisement intended to be shown in a time slot was actually seen. The time slot exchange server also settles accounts in a time slot trade, debiting an account of a seller and crediting an account of a buyer in accordance with the terms of the trade.

35 Claims, 5 Drawing Sheets

SYSTEM AND METHOD FOR COMPLETING ADVERTISING TIME SLOT TRANSACTIONS

BACKGROUND OF THE INVENTION

The present invention provides a system and method for trading advertising time slots for programs displayed to viewers, delivering advertising content to broadcasters, and settling accounts between parties to a transaction.

Known systems and methods for showing programs with advertisements to viewers employ various transmission media, including: terrestrial broadcast; cable; and direct satellite broadcast. Program creation and transmission services are paid for at least in part by the sale of program time slots to advertisers. A time slot is filled with advertising content (e.g., an advertisement) used to convey an advertiser's message to the viewers of the program in which the time slot occurs.

Known systems for trading time slots are typically ad hoc. An owner of a time slot (e.g., a program owner, a broadcaster, etc.) wishing to sell it to a buyer (e.g., an advertiser) often employs a seller intermediary, who frequently interacts with a buyer intermediary. These intermediaries do not generally provide objective, third-party information regarding the value of time slots to prospective buyers. thus, it can be difficult or impossible for a buyer to accurately assess the value of an offered time slot. A better system would provide objective marketing and valuation information that could be used by both a buyer and a seller in accurately determining and mutually agreeing upon a fair price for a time slot.

Another disadvantage for buyers in known systems is known as bundling. Owners may sell desirable time slots bundled with less desirable time slots for which the buyer has little or no use. In this case, the buyer can be forced to re-sell the unwanted time slots, or advertise in them to a small or inappropriate viewership for the advertiser. A better system would enable a buyer to bid only on those time slots the buyer is interested in acquiring. If bundled time slots were made available on the better system, then the better system would provide a fluid and efficient marketplace where the buyer could quickly and inexpensively resell the time slots in which it has little or no interest in retaining.

Yet another disadvantage of known systems is that the price of a time slot can vary according to factors unrelated to the actual value of the time slot. These factors include: the respective sizes (i.e., bargaining powers) of the buyers and sellers; and the performances of the intermediaries. A better system would allow all buyers and sellers to trade the same time slot at the same price regardless of the respective size of each party, and would diminish the importance of the performance of the intermediaries in efficiently trading a time slot.

In a typical known system for buying and selling an advertising time slot, a buyer (e.g., an advertiser) arranges the purchase of a time slot through a buyer intermediary (e.g., an advertising agency) that can also have helped produce the advertisement. A seller (e.g., a broadcaster) arranges the sale of a time slot through a seller intermediary (e.g., a "rep" firm). In exchange for their services, the intermediaries charge their clients service fees.

A rep firm typically canvasses advertising agencies, offering time slots for sale in an ad hoc fashion over the telephone until a buyer is found. When a buyer is found, a telephone agreement and verbal contract that trades (carries out a transaction in which the seller sells and the buyer purchases) the time slot is negotiated and concluded. This verbal agreement disadvantageously leaves no reliable written record to which to refer in the event of a later disagreement over terms. A better system would produce a written record of the terms of each trade to prevent and assist in resolving any later misunderstanding as to the trade.

A disadvantage of employing intermediaries such as advertising agencies and rep firms is that the interests of the intermediaries do not always coincide with the buyers and sellers whom they represent. Purchases and sales that generate the highest fees can be given priority, while less lucrative deals that are nonetheless important to their clients are allowed to languish. Also, incentives to rep firms can be attached to the sale of certain less desirable slots, motivating the rep firms to cast the value of the slots in an overly favorable light in order to sell them quickly. A better system that provides objective time slot marketing and valuation data from a third party would balance subjective claims made by the seller and/or owner of the time slot.

Another inefficient and ad hoc aspect of known systems concerns follow-up activities after a time slot is traded. These activities include Proof of Delivery (POD) of the advertisement to the broadcaster; and verification that the advertisement was indeed properly aired in the time slot for which it was purchased.

Accounts settlement is another follow-up activity that can be disorderly and inefficient in known systems. Different billing and payment systems between different trading parties can lead to delays and misunderstandings, especially among parties who have not dealt extensively with each other before. A better system would provide standard, automated accounts settlement services, thereby creating a better understood and more uniform set of billing and payment expectations among trading parties. Because known systems are generally ad hoc, historical time slot trading information is not widely collected and made generally available to buyers and sellers. A better system would provide such information as a guide for valuing time slots and assessing the performances of various parties to transactions.

A better system for trading time slots could be made more efficient, economical, and fair by reducing the importance of intermediaries and providing an orderly marketplace for advertising time slots that is easily and directly accessible to both buyers and sellers. Buyers and sellers could operate in relative anonymity and with equal bargaining power regardless of their sizes. The marketplace would provide objective information for fairly and accurately determining the value of a time slot, and would effectuate transactions quickly and efficiently. Such a better system would provide for follow-up activities such as accounts settlement, proof-of-delivery, and verification. The better system would maintain and make available records of transactions, including terms and conditions, for assistance in settling any disagreements regarding the same. Such a better time slot trading system would be more economical, efficient and fair than known trading systems.

SUMMARY OF THE INVENTION

The present invention advantageously provides a Time Slot Exchange Server (TSES) that serves as a fair and efficient marketplace for selling and buying advertising time slots; settling accounts between the seller and the buyer of a time slot; ensuring that a broadcaster is in possession of an advertisement intended to be shown in the time slot; and sending verification data to an advertiser pertaining to how the advertisement intended to be shown in a time slot was actually shown.

In accordance with the present invention, the TSES is connected to a network to which a time slot buyer and seller are also connected. A time slot offer is received at the TSES from a time slot seller. The time slot offer includes time slot data describing, inter alia, the time slot and the program in which the time slot occurs. The TSES advantageously makes time slot marketing valuation data available to the buyer. Marketing and valuation data is collected from sellers, broadcasters, and/or an independent ratings agency, and assists the buyer to identify offered time slots that meet the buyer's requirements, and to accurately value time slots. This advantageously provides a broad range of information to the buyer to enable the buyer to make better informed, more efficient buying decisions. It also equalizes the bargaining powers of buyers of different size because all buyers have access to this information.

In accordance with the present invention, a bid is received from a buyer. In one embodiment, the bid is a specific bid directed towards obtaining a specific time slot. In another embodiment, the bid is a set of criteria, including a bid price. An example of a non-specific bid is for a thirty second time slot occurring in the first set of time slots in a program that is shown in the greater Chicago metropolitan area and that is typically viewed by households with a median income of between $25,000 and $40,000. The present invention advantageously provides offer and bid information to both buyers and sellers, creating an efficient marketplace superior to the ad hoc, piecemeal approach used to trade time slots using known systems.

When a bid is received, the TSES identifies offers whose terms correspond to the terms of the bid. An offer "corresponds" to a bid when the terms of the offer meet or exceed the bid terms. The buyer can advantageously set tolerances for detecting such correspondence, e.g., by assigning weights to various components of the bid terms. This advantageously allows the buyer to more precisely identify the time slot offers that best meet the buyer's requirements, and prevents the buyer from missing offers that substantially (although not entirely) meet the buyer's bid terms.

In accordance with the present invention, the TSES receives a request from a buyer to purchase a time slot. The TSES carries out a time slot transaction in which the ownership of the time slot is transferred from the seller to the buyer. In accordance with one embodiment of the present invention, an account of the buyer is debited an amount in accordance with the terms of the transaction, and an account of the seller is credited. In accordance with the present invention, a buyer account, a seller account, or both can be debited a service fee by the TSES. This advantageously settles accounts between the parties quickly, avoiding the ad hoc invoicing and payment systems used in known time slot transaction systems, which can be unreliable and slow.

Once a time slot is purchased, generally by an advertiser or agent of an advertiser, an advertisement to be shown in the time slot must be provided to the broadcaster. In accordance with one embodiment of the present invention, the TSES informs the advertiser as to whether the broadcaster is in possession of a copy of the advertisement to be shown in a time slot. If the broadcaster does not have a copy of the advertisement, the TSES receives a copy from the advertiser, and forwards it to the broadcaster. The TSES confirms that the broadcaster has received the copy of the advertisement, and notifies the advertiser to this effect.

An advertiser is also concerned that an advertisement is broadcast properly in the time slot for which it was purchased. In accordance with one embodiment of the present invention, the TSES provides the advertiser with verification data received from an independent verification service that pertains to how the advertisement was shown in its intended time slot. Verification data can include factors such as whether the entire advertisement was broadcast; broadcast quality factors; the actual time and date on which the advertisement was broadcast; and so on.

The present invention advantageously provides an economical, fair and efficient marketplace for carrying out time slot transactions, including accounts settlement, advertisement delivery and broadcast verification services.

DETAILED DESCRIPTION

Figure 1:
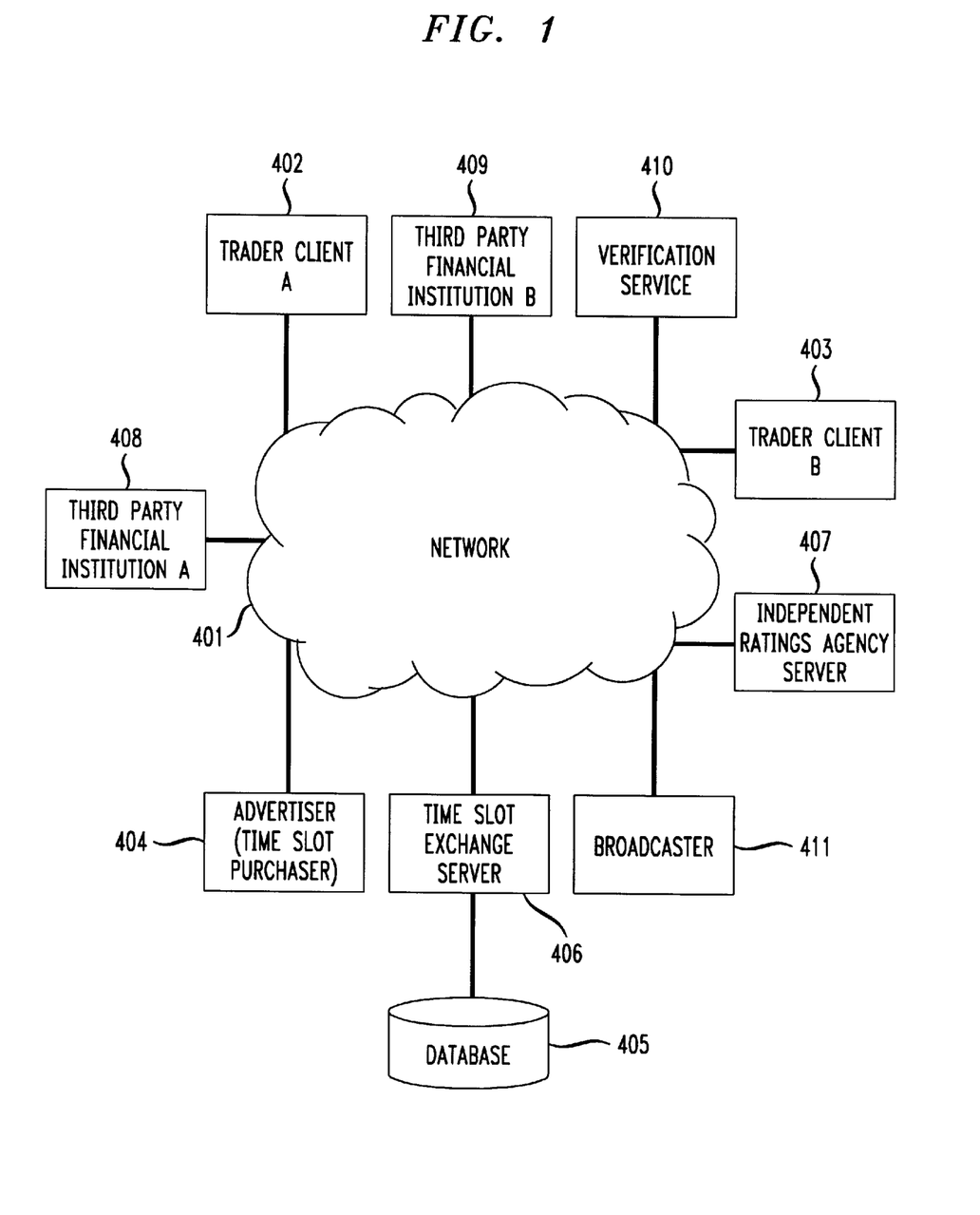
FIG. 1 shows an embodiment of a system in accordance with the present invention.

An embodiment of a system in accordance with the present invention is shown in FIG. 1. Network 401 interconnects trader client A 402, a trader client B 103 and the Time Slot Exchange Server (TSES) 406. A client trader can be a buyer, a representative of a buyer, a seller, or a representative of a seller. In this embodiment, client trader A 402 is a seller and client trader B 403 is a buyer.

A client includes a computer with a network address (either permanently or temporarily assigned) and client software with which the client can interact with the TSES (e.g., send bids, offers, obtain information, etc.) In one embodiment, this software is customized and distributed in known fashion to clients whose users have subscribed to the service provided by the TSES. In another embodiment, such software includes a browser for the World Wide Web (WWW), such as the Netscape Navigator manufactured by the Netscape Communications Company, or the Internet Explorer manufactured by the Microsoft Company. The TSES executes WWW server software (such as WWW servers made by Netscape Communications and Microsoft) that interacts with the browsers. In the embodiment with browsers and WWW software, network 401 is hypertext network such as the Internet or an Intranet. The functionality of a browser executed on a client can be enhanced in accordance with the present invention by Java applets and the like transferred from the TSES to the client when the TSES is accessed by the client.

The TSES includes a computer with a network address and TSES software for providing the time slot transaction services in accordance with the present invention. TSES 406 is connected to database 405. In one embodiment of the present invention, database 405 stores data pertinent to time slot trading and follow-up activities. This data includes time slot bid and offer data, time slot marketing and evaluation data, status data, historical trading data, order fulfillment data, broadcast verification data, and accounts settlement data. For example, when a time slot offer is sent to the TSES 406, a time slot offer record is stored in the database 405.

A pseudo code embodiment of a data structure of a time slot offer is as follows:

```
time_slot( )
{
    program_name;
    program_id;
    program_rating;
    broadcast_date;
    broadcast_time;
    broadcaster_id;
    time_slot_id;
    time_slot_position;
    time_slot_duration;
    time_slot_owner;
    time_slot_ask_price;
    marketing_and_valuation_pointer;
    status_flags;
}
```

The program_name is the title of the program. If the program is an episode of a series of programs, the program_name can include both the series name and the episode name. The program_id is typically a number associated with the specific program (e.g., series episode). The program_id can be correlated to other data sets stored on database 405, such as marketing and valuation data.

Marketing and valuation data assists the seller and/or buyer to value a time slot, and helps the buyer to determine important viewership properties of the time slot. The present invention can advantageously receive, index, and make available marketing and valuation data from a variety of sources. For example, the program_id can be correlated to a ratings data set provided by an objective independent ratings agency (IRA). A record in the IRA ratings data set correlated with a particular time slot can include critics' notes, audience ratings, content notes and viewership estimates for the program.

Marketing and valuation data can also be provided by the broadcaster. For example, such data can include information regarding the program, the viewership reached by the broadcaster, and so on. Marketing and valuation data is advantageously made available to a buyer 403 and seller 402 clients by the TSES 406, enabling both buyer and seller to make better informed trading decisions (such as pricing and valuation.)

The program_rating includes the audience rating of the program (e.g., G, PG, PG-17, etc.), and can be duplicated in the ratings data set. This advantageously provides a client with the opportunity to access important time slot information from more than one perspective.

The broadcast_date and broadcast_time are the date and time at which the program in which the time slot occurs is to be shown. The broadcaster_id is typically a number that identifies a specific broadcaster, or a specific group of broadcasters, such as a cable interconnect. Hereinafter, the term "broadcaster" can refer to a single broadcaster or group of broadcasters. The broadcaster_id can be correlated to other data sets stored on database 405. For example, the broadcaster_id can be correlated to a broadcaster marketing and valuation data set that provides information on the geographical footprint of a broadcaster, the demographics of the broadcaster's viewing area, the reliability with which the broadcaster has shown advertisements in contracted-for time slots, the cost per thousand of showing an advertisement, and other information pertinent to the broadcaster that is useful for making an informed buying decision for a time slot. This broadcaster information can be supplied by the broadcaster, and/or an objective third party. This data set is made available to traders through TSES 406.

The time_slot_id is an identifier assigned to the time slot by the TSES 406.

The time_slot_position indicates the position of the time slot in the program. A pseudo-code example of a data structure for the time slot position is as follows:

```
time_slot_position( ) {
    position_in_program;
    position_in_group;
}
```
The position_in_program indicates where the time slot occurs. For example, the position could be in the first group of time slots, the second, etc. The position_in_group shows where the time slot occurs within the group. For example, the time slot could occur as the first of a group of three time slots, the second, etc. Information on the position of a time slot in a program helps establish the value of the time slot.

The time-slot-duration indicates the length of the time slot (e.g., in seconds). The time_slot_owner identifies the owner of the time slot, and can include both a textual representation of the owner name (e.g., Mediaplex, Inc.) and an owner identification number. The owner identification number can be correlated with an owner data set stored on database 405. The owner data set includes information about the owner of the time slot, such as the location of the owner, business information, credit-worthiness, buyer ratings, historical reliability, and other information useful to a buyer in making an informed purchasing decision.

The time_slot_ask_price indicates the amount for which the owner is asking for the time slot.

The marketing_and_valuation pointer points to the location of any additional marketing and valuation data, or to an index of such locations. This advantageously allows a trader to easily locate and access information regarding properties of a time slot that impact viewership and the value of the time slot.

The status_flags are useful for indicating the status of the time slot, including "for sale", thus inviting bids from prospective buyers; "sold", thus cutting off bids, etc. In accordance with the present invention, time slot data is advantageously searchable by a selling or buying trader with an easy-to-use graphical user interface (GUI) displayed on the trader's client in accordance with the present invention. In one embodiment, the GUI is a hypertext page obtained by the client from the TSES and displayed on the client by a known browser, such as the Netscape Navigator made by Netscape Communications Company, or the Internet Explorer, made by the Microsoft Company. In another embodiment, the GUI is a hypertext page augmented by executable software (e.g., Java applets) obtained from the TSES that enhance the functionality of the GUI. In yet another embodiment, the GUI is provided by proprietary software distributed to clients.

Figure 2:
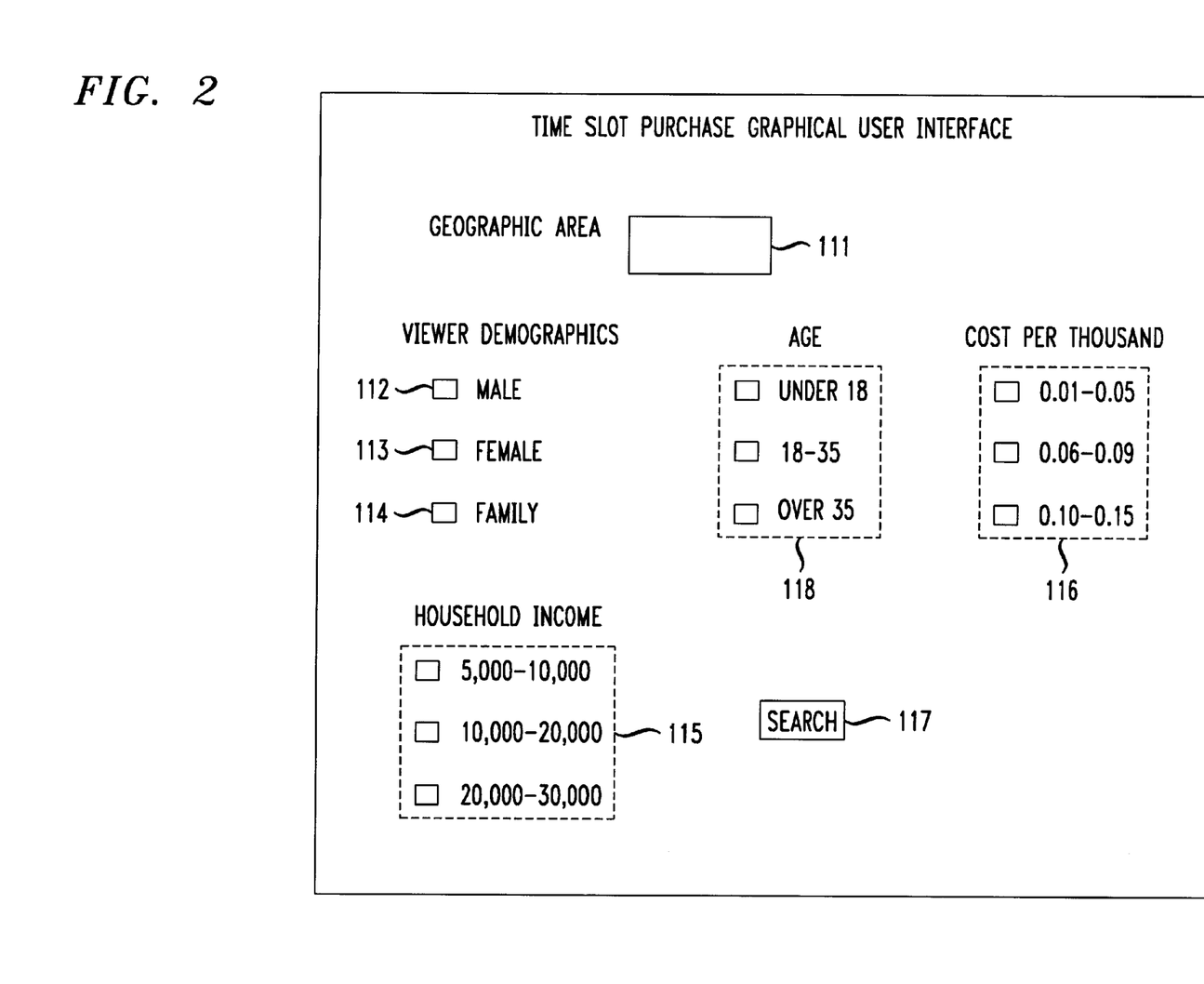
FIG. 2 shows an embodiment of a graphical user interface shown to a prospective buyer of a time slot in accordance with the present invention.

An embodiment of a GUI is shown in FIG. 2. A buyer can search for suitable time slots by entering a geographic area in box 111; checking the appropriate demographic requirements (male 112, female 113, family 114, household income 115, age range 118); and the cost per thousand 116 which the buyer is willing to pay. When the buyer has finished entering the required information, the buyer selects the search button 117. In another embodiment, the buyer search GUI accepts criteria including date and time of broadcast, program name, program id, broadcaster, and other fields. The term "criteria" as used herein is equivalent to the term "requirements". In this way, the GUI advantageously provides the buyer with an easy to use and convenient way to search time slot data, including marketing and valuation data, to find the time slot best suited for her needs.

In response to the buyer request, the TSES searches for time slots offered for sale, and sends information to the buyer that is advantageously displayed to the buyer in an easy to understand GUI that includes information on such time slots that meet or nearly meet the criteria specified by the buyer. In one embodiment of the present invention, the information included on the displayed GUI is selectable by the buyer, who specifies the information to be displayed in the form of display preferences in known fashion. The buyer can be shown the program name, program id, broadcaster id, time slot owner, duration, position and ask price. Another advantageous feature of the present invention is that the buyer can specify tolerances as to how strictly the submitted search requirements should be interpreted by the TSES. For example, the buyer can specify that only complete matches be returned. Alternatively, the buyer can specify that matches of 80% of the criteria be returned. In this way, the buyer can advantageously locate the most suitable time slot, even if the most suitable time slot does not meet all of the buyer's submitted criteria.

In yet another embodiment, the buyer can advantageously assign weights to the submitted requirements. For example, the age requirement can be assigned a weight of '10' by the buyer, while the income requirement can be assigned a weight of '20', indicating that the income requirement should be interpreted as twice as important as the age requirement by the TSES. The TSES advantageously uses weight information to prioritize time slots that meet some or all of the submitted criteria, advantageously selecting and displaying to the buyer time slots ranked from most suitable to less suitable based upon the needs specified by the buyer in terms of weighted requirements.

A buyer can access other GUIs by selecting an item on which further information is desired in known fashion (e.g., in the way hypertext links are used in documents written in Hypertext Markup Language (HTML)). For example, if the buyer selects a particular program id or program title, another GUI is displayed to the buyer that presents content and critics' notes, audience ratings, detailed audience demographics, and other information pertinent to the program corresponding to the selected program id or program title. Likewise, if the buyer selects a particular broadcaster, another GUI presents detailed information on the broadcaster's geographic area, viewership, reliability, and other information. In like manner, selecting other fields provides GUIs that include detailed information on topics pertaining to the selected area. In this way, the present invention advantageously links related information regarding a time slot to enable easy and convenient access to the information needed to make an informed and intelligent buying decision.

In one embodiment of the present invention, each time slot shown to the buyer that approximately meets, exactly meets, or exceeds the criteria set by the buyer has a bid button. When the buyer selects the bid button for a time slot, the buyer is presented with a menu by which the buyer may submit a bid for the time slot, specifying the bid price (e.g., by entering a dollar amount, or indicating that the buyer wishes to accept the seller's offer price and/or other terms.)

A selling trader is presented with a GUI through which the seller can access substantially the same information as the buyer, including ratings information, content and critics notes, viewer demographic information, valuation and marketing information, and other information pertaining to time slots. The owner is also provided with a GUI that displays the current status of its time slots registered on the TSES. The GUI can display the status of a specific time slot or group of time slots that meet criteria provided by the owner, or else all of the time slots registered by the owner. In accordance with the present invention, the selling owner need not be the same party as the seller. The selling owner can be represented by a selling trader. Alternatively, the selling owner and the selling trader can be the same party. Hereinafter, the term "seller" indicates either a party authorized to accept a bid and make a trade, and can be a selling owner, a selling trader, or both.

In one embodiment of the present invention, the status includes the values of bids received from prospective buyers, buyer identification information, and other useful information in assessing bids. A seller can accept a bid and effectuate a transaction by selecting an accept button next to each bid.

The present invention can also advantageously provide historical transaction data including the terms by which similar time slots have been traded in the past. This data can assist a buyer and seller in properly valuing a time slot. For example, historical data indicating that thirty second time slots in episodes of a series broadcast in a particular geographic area have consistently sold for between twelve thousand and thirteen thousand dollars for the past three years advantageously gives a prospective buyer a good point of reference in determining the value of such a thirty second time slot presently for sale.

Historical data can also include historical program data, including geographical areas in which the program has been viewed, the dates and times the program has been broadcast, data about past viewership of the program, and so on. This type of historical data can be useful in estimating the desirability and viewership of a program about to be broadcast. For example, an episode of a series that had only recently been aired in a given area would be likely to draw a more limited viewership than on the date of its previous airing. Such information can be a factor in valuing the time slots for sale in a given program.

Figure 3:
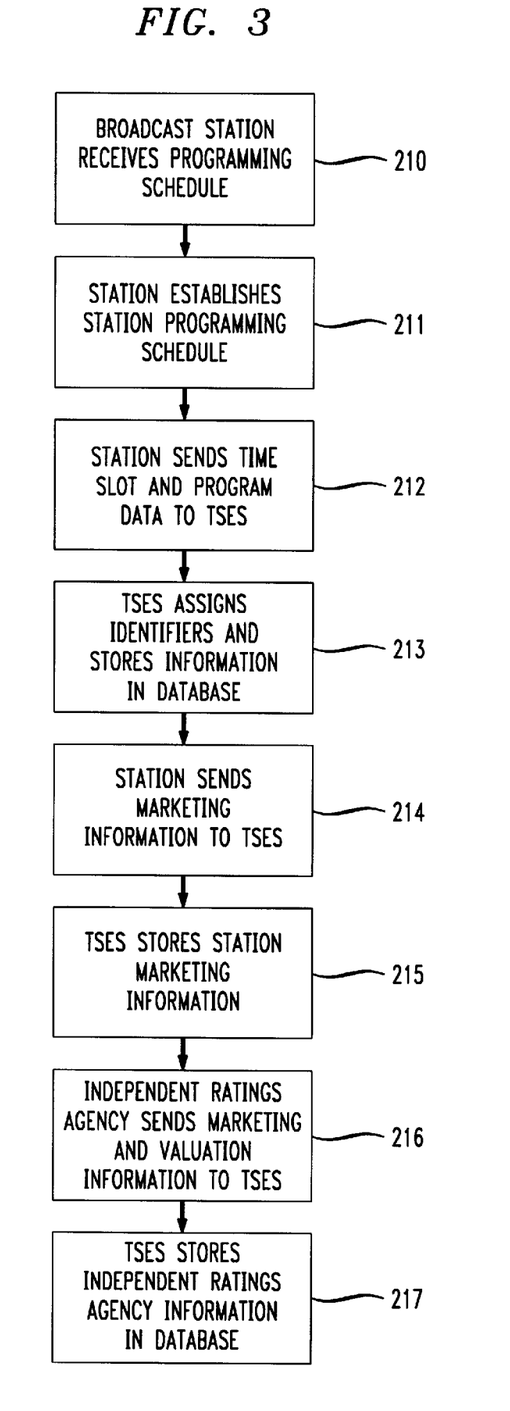
FIG. 3 shows an embodiment of the method for assembling time slot data in accordance with the present invention.

An embodiment of a method for building a time slot offer and related information in accordance with the present invention is shown in FIG. 3. A broadcast station receives and assesses the programming schedule of the network with which it is affiliated 210. The programming schedule can be for a single program or a series of programs. It also receives the programming schedules for competing stations and networks. The station schedules each to be broadcast on a certain date at a certain time 211. The station sends data to the TSES that includes the name of the program (including series and episode name, where appropriate); a description of each program; the station identifier; the identity of the broadcast network; the broadcast schedule; the number of time slots available in the program; the position of each time slot; the duration of each time slot; and programming notes 212. The TSES assigns an identifier to the program and an identifier to each time slot, and stores the identifiers along with the data received from the station in the database 213.

The station then submits marketing and valuation information to the TSES, including audience ratings (e.g., G, PG, PG-13, etc.), content notes, and viewership estimates 214. The TSES stores this marketing and valuation information in the database, and correlates ("indexes") it with the program and time slot information, noting that the source of this marketing information was the station 215.

An independent ratings agency (IRA) submits marketing and valuation information to the TSES, including audience ratings, quality ratings (e.g., poor, fair, good, excellent, etc.), content notes, critics' notes, and viewership estimates 216. The TSES stores this IRA marketing and valuation information correlated with the other program information, noting that the source of this marketing and valuation information was from an independent ratings agency 217. Time slot information collected and stored in accordance with the present invention can be advantageously used by parties to a transaction to accurately identify a time slot with desired properties (e.g., that meets demographic viewership requirements), fairly value the time slot, and make an informed decision as to the terms on which to carry out a transaction.

In another embodiment of the present invention, the buyer and/or seller wishing to access IRA marketing and valuation data communicate with the TSES, which then accesses the requested IRA data real-time and passes it on to the requester. In another embodiment, the TSES acts as a focal point and relay between the requester and the IRA, essentially connecting the requester directly with the IRA. The requester then interacts with the IRA to obtain needed information.

In order to initiate the trading process in accordance with one embodiment of the present invention, the a time slot offer is received at the TSES from a seller. The offer includes the terms of the offer, including the offer price for the time slot. The TSES establishes and stores an offer record that includes an offer identifier assigned by the TSES, the identifier of the time slot for sale, the date and time the offer was made, the terms of the offer, and the status of the offer (e.g., "open", "closed", "withdrawn", etc.) Thereafter, the TSES makes the time slot data record available (i.e., accessible) to traders seeking to buy a time slot. The present invention also advantageously makes available marketing and valuation data to the prospective buyers in order to assist them in making informed trading decisions. In accordance with the present invention, the trading seller is advantageously able to view any relevant bids and/or inquiries pertaining to the time slot offered for sale. When a bid is received for the offered time slot such that the bid price meets or exceeds the offer price, the TSES executes a trade.

A bid is received as a message at the TSES, and includes a bidder identifier, the identifier of the time slot upon which the bid is made, and the terms of the bid (e.g., price, accept offered price, etc.) When the bid message is received by the TSES, the TSES establishes and stores a record of the bid, including a bid identifier assigned by the TSES, the identifier of the time slot for sale, the date and time the bid was made, the terms of the bid, and the status of the bid (e.g., "open", "closed", "withdrawn", etc.)

A bid can be submitted as a specific bid or non-specific bid in accordance with the present invention. A specific bid targets a specific offered time slot and/or offered package of time slots. The TSES executes a trade if the bid price meets or exceeds the offer price. If the bid price falls below the current offer price, the terms of the bid are simply made available to the seller through a GUI. In accordance with the present invention, the seller can advantageously view specific bids for its offered time slots, and change the offer price to effectuate a trade. Alternatively, the seller can hold firm, raise the price, or otherwise alter the terms of its offer as it wishes. In this way, a fluid and efficient marketplace is established.

A non-specific bid is based upon criteria not specific to a particular time slot. For example, a buyer can bid for a time slot that occurs in a program to be shown in the greater Chicago metropolitan area in a range of dates in late June and to viewers who fit a particular demographic profile. When the non-specific bid is received, the TSES searches the database for offered time slots that meet (or nearly meet) the criteria submitted by the bidder. The buyer and/or seller can specify criteria (e.g., tolerances) under which a bid is sufficiently close enough to an offer to justify its display to the interested party. For example, although a bid seeks a time slot with a viewer demographic focussing on households with annual incomes between $20,000 and $30,000, the bidder can specify a ten percent tolerance in the household income requirement. Thus, time slots meeting other criteria that will be seen by households with incomes from $18,000 and $33,000 may be reported to the bidder. In accordance with the present invention, the TSES can search the database periodically, so as to capture any matching time slots offered for sale after any earlier searches.

In one embodiment, such matching and/or nearly matching offered time slots are displayed to the bidder for further evaluation. A trade is executed if the bid price exceeds the offer price of an offered time slot that meets or exceeds the criteria submitted by the bidder. If more than one time slot meets or exceeds the criteria of the bidder at less than the bid price, they are displayed to the bidder so that the bidder can select which time slot to purchase.

In accordance with the present invention, a party that has submitted a bid or offer to the TSES can withdraw the bid or offer. In this event, the party sends a withdrawal message to the TSES that includes the identifier for the bid or offer sought to be withdrawn. If no trade has been executed with respect to the bid or offer, the TSES changes the status flag in the record of the bid or offer from "open" to "withdrawn". Any traders who had expressed an interest in the bid or offer are sent messages indicating the changed bid's or offer's new status.

In accordance with the present invention, when a trade is executed, a record of the transaction is created in the database by the TSES. In one embodiment, the transaction record includes the bid identifier, the offer identifier, date and time of the transaction, and a transaction identifier created by the TSES. The status fields of the bid and offer are changed from "open" to "closed". The ownership of the time slot is changed from the seller to the buyer in the database.

The present invention also advantageously provides accounts settlement services. In one embodiment, third party financial institutions are notified by the TSES to debit and credit the appropriate accounts in accordance with the terms of the transaction. Service fees can also be transferred from the buyer and/or seller of the time slot to accounts of the TSES service provider. Confirmations are sent to both buyer and seller.

An executed trade can be broken with the consent of both parties to the trade in accordance with the present invention. A broken trade can arise due to a change in circumstances (e.g., a change in programming) that affects the showing of a time slot, a change in the financial status of the buyer, etc. Negotiations concerning the breaking of a trade can substantially occur outside the TSES. The TSES can be used as a tool for formalizing and making a record of the breaking of the trade. In accordance with the present invention, a party wishing to break the trade submits message that includes an offer to break the trade to the TSES. The second party is notified of the offer, and sends a message to the TSES accepting the first party's offer to break the trade. The trade is broken, and confirmations are sent to both parties. The TSES then changes the ownership of the time slot from the buyer to the seller in the database. In one embodiment of the present invention, the TSES also notifies relevant third party financial institutions of the broken transaction, and causes the seller's account to be debited and the buyer's account to be credited, essentially returning the parties to the status quo before the trade. The TSES can assess any penalties and charge service fees as appropriate during this process.

The present invention also advantageously provides fulfillment services. In one embodiment of the present invention, the contents to be shown during the time slot (the advertisement) are delivered to the broadcaster through the TSES. In accordance with the present invention, an advertiser (e.g., the owner of a time slot) sends a message to the TSES to verify that the broadcaster has a copy of the advertisement. After verifying the advertiser's ownership of the time slot, the TSES sends a message to the broadcaster asking the broadcaster to verify that it has a copy of the advertisement. If the broadcaster responds that it has a copy, then a message is sent from the TSES to the advertiser indicating the same. If the broadcaster responds that it does not have a copy of the advertisement, then the advertiser is notified. The advertiser then sends a copy of the advertisement to the TSES with a request to deliver the advertisement to the broadcaster. The advertisement is delivered, and a confirmation message is sent to the advertiser. In accordance with the present invention, the advertisement can be comprised of audio, video, graphics, animation, text, or any combination thereof.

Verification services can also be advantageously provided in accordance with one embodiment of the present invention. The TSES obtains verification data (e.g., the time and date on which the advertisement was actually broadcast, broadcast quality, etc.) from an independent verification service and sends it to the advertiser.

Figure 4:
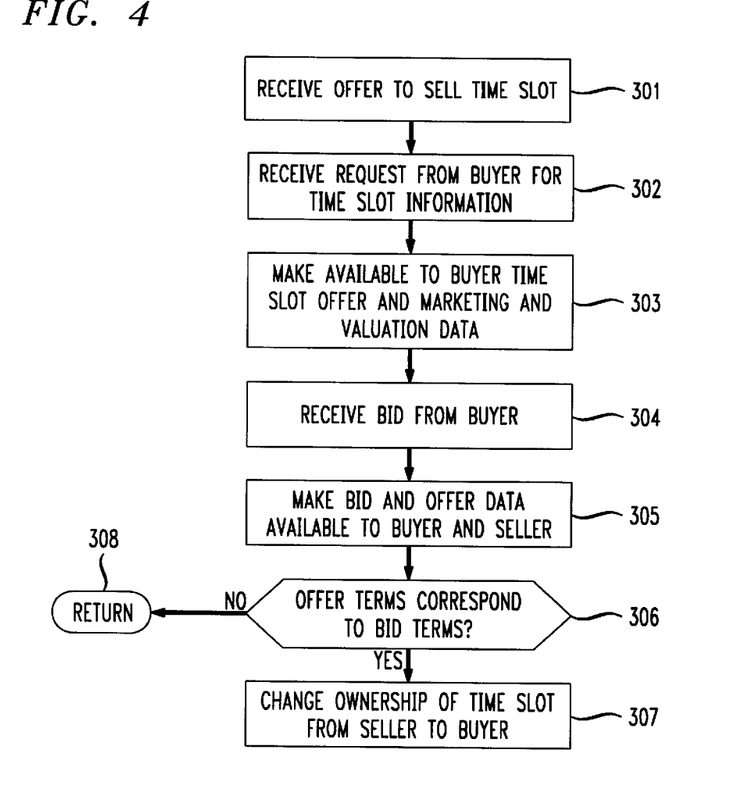
FIG. 4 shows an embodiment of the method for carrying out a time slot trade in accordance with the present invention.

An embodiment of the method for carrying out an advertising time slot trade in accordance with the present invention is shown in FIG. 4. The TSES receives an offer to sell a time slot with offer terms from a seller, step 301. The TSES receive a request from a buyer for time slot information, step 302. This information can include information about time slot offers, marketing and valuation data, historical transaction data, and other data pertinent to time slot transactions. In another embodiment of the present invention, time slot offer and marketing and evaluation data is sent automatically to the buyer, without requiring a request for the same from the buyer.

Time slot offer and marketing and valuation data is made available to the buyer, step 303, to assist the buyer in identifying time slots that meet the buyer's requirements, and to accurately value the time slot. A bid is received from the buyer to buy a time slot, step 304. The bid can be a specific bid or a non-specific bid. Bid and offer information are made available to the buyer and the seller, step 305. In this way, the buyer and seller can monitor outstanding bids and offers, and make appropriate adjustments in the terms of their respective bids and offers to facilitate transactions. For example, a seller can lower the price term of an offer without bids, or with bids submitted with bid prices substantially lower than the offer price.

The TSES determines if the offer terms of an offered time slot correspond to the bid terms of the buyer, step 306. If the offer terms correspond to the bid terms, then in one embodiment of the present invention, a transaction is carried out that changes the ownership of the corresponding time slot from the seller to the buyer, step 307. In another embodiment (not shown), the buyer is first informed of offers corresponding to the buyer's bid, and the buyer can then advantageously obtain further detailed information (such as marketing and evaluation data) regarding corresponding time slots. The buyer then selects which (if any) time slot or slots to purchase in an advantageously informed way, and a transaction transferring ownership of a time slot selected by the buyer to be purchased is carried out by the TSES. If the offer terms do not correspond to the bid terms, then the system does not carry out a trade without further input from the buyer or seller, step 308.

Figure 5:
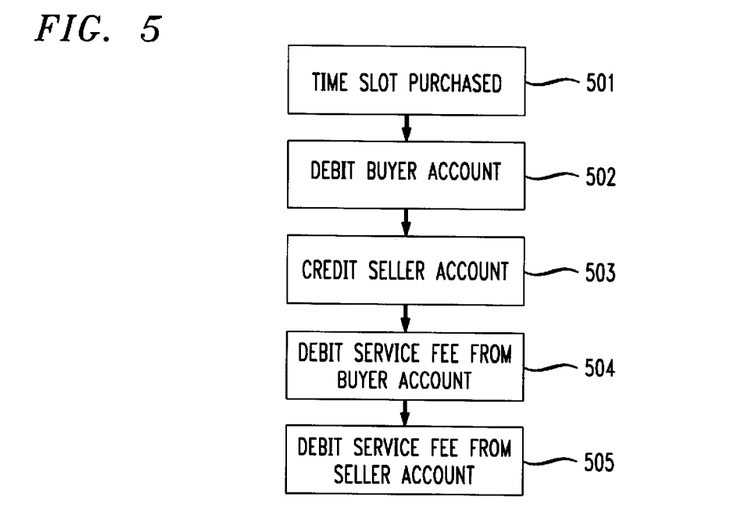
FIG. 5 shows an embodiment of the method for carrying out accounts settlement in a time slot transaction in accordance with the present invention.
Figure 6:
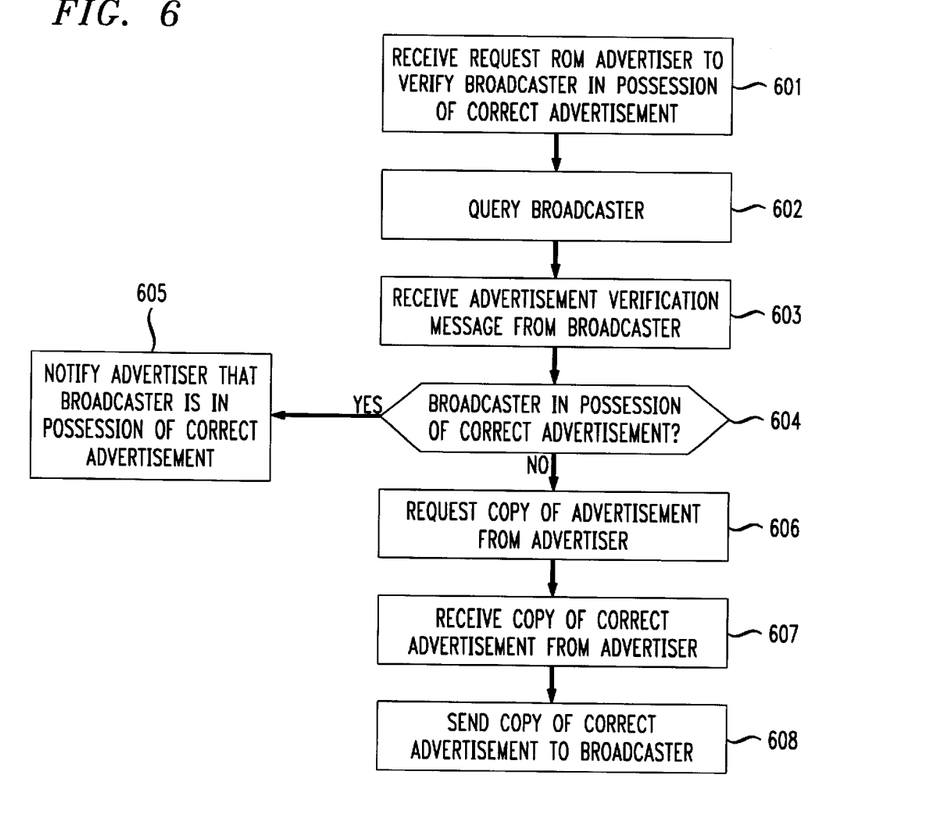
FIG. 6 shows an embodiment of the method for ensuring that the broadcaster has a copy of an advertisement to be shown in a time slot in accordance with the present invention.

An embodiment of the method for settling accounts in accordance with present invention is shown in FIG. 5. When a time slot has been purchased and ownership transferred from the seller to the buyer, step 501, the TSES debits the buyer's account, step 502, and credits the seller's account, step 503, in accordance with the terms of the transaction. The TSES can also debit a service fee from a buyer's account, step 504, and/or a seller's account, step 505.

Figure 7:
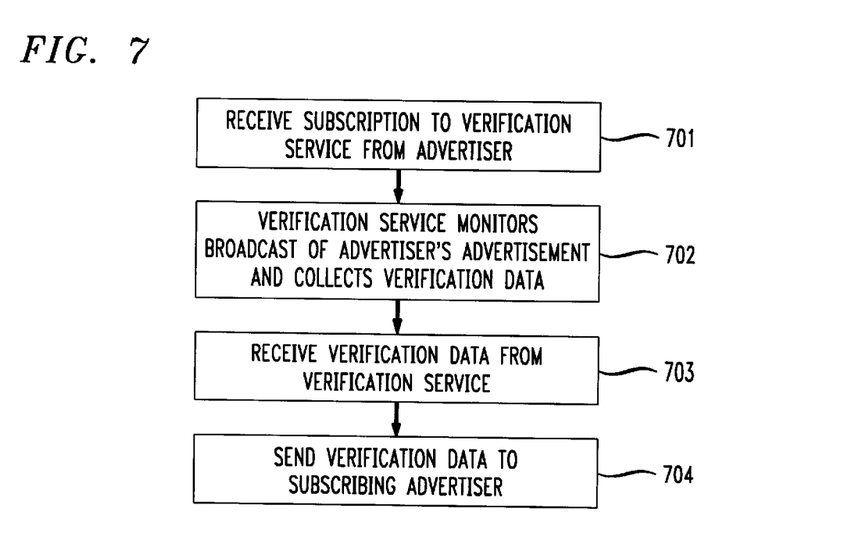
FIG. 7 shows an embodiment of the method for verifying the time and quality of a broadcast of an advertisement intended to be shown in a time slot in accordance with the present invention.

An embodiment of the method for ensuring that a broadcaster has a copy of an advertisement intended by an advertiser to be shown in a time slot in accordance with the present invention is shown in FIG. 7. The TSES receives a request from an advertiser to verify that the broadcaster of a program containing a time slot which the advertiser has purchased is in possession of the advertisement intended to be shown in the time slot, step 601. The TSES queries the broadcaster, step 602. The TSES is notified by the broadcaster as to whether the broadcaster has a copy of the advertisement, step 603. If the broadcaster is in possession of the advertisement, step 604, then the TSES so notifies the advertiser, step 605. If broadcaster is not in possession of a copy of the advertisement, step 604, then the TSES requests the advertiser to send a copy of the advertisement to the TSES, step 606. The TSES receives a copy of the correct advertisement from the advertiser, step 607, and forwards it to the broadcaster, step 608.

Another embodiment of the method for verifying the date, time and quality of a broadcast advertisement in accordance with present invention is shown in FIG. 7. The advertiser subscribes to an independent verification service through the TSES, step 701. This subscription can take the form of a specific request for verification services pertaining to a particular time slot, or a subscription with specific terms for recurring service. When an advertisement is shown, an independent verification service monitors the broadcast, and collects and processes verification data pertaining to whether, when and how the advertisement broadcast in a time slot was actually seen, step 702. For example, verification data can include the date and time at which an advertisement in a time slot was actually broadcast, the quality of the broadcast, the content of the advertisement (i.e, to verify if the correct advertisement was shown), etc. The TSES receives the verification data from the verification service, step 703, and sends verification data to the subscribing advertiser, step 704. The verification data sent to the user can be identical to the verification data received by the TSES from the independent verification service, or can be a processed and/or edited version of the same.

In accordance with the present invention, terms of a transaction are advantageously stored in a database as historical transaction data, which is useful for, inter alia, assessing trends and valuing time slots.

The present invention advantageously provides an efficient system for collecting and disseminating information (such as marketing and valuation data) necessary to fairly value and efficiently trade advertising time slots for programs. It advantageously provides a single point of contact for effectuating transactions whereby a time slot is bought and sold, accounts between buyer and seller are settled, an advertisement is delivered from an advertiser to a broadcaster, and through which broadcast verification data is obtained. The present invention advantageously brings uniformity to a presently ad hoc marketplace, and equalizes bargaining power between trading parties, resulting in a more efficient and better marketplace for advertising time slot transactions.

I claim:

1. A method for completing a transaction over a network between a buyer and a seller relating to an advertising time slot, comprising the steps of:

receiving a time slot offer message over the network from the seller, said offer message having associated offer terms, a time slot identifier and an ownership field indicating the owner of said time slot;

storing data from said offer message including said ownership field as a time slot offer record in a database;

receiving a bid message over the network from a buyer with bid terms for said advertising time slot, the bid terms including time slot criteria indicating properties of the advertising time slot; and if the bid terms correspond to the offer terms of said advertising time slot, then changing the ownership field in the time slot offer record from the seller to the buyer.

2. The method of claim 1, wherein the offer to sell the time slot includes an identifier of the program in which the time slot occurs, the broadcaster scheduled to show the program in which the time slot occurs, the date and time on which the program is scheduled to be shown, and the time slot owner, and further comprising the steps of assigning a time slot offer identifier to the time slot offer record.

3. The method of claim 2, further comprising the steps of assigning a program identifier to said time slot offer record.

4. The method of claim 1, further comprising the steps of receiving a request message from the buyer for time slot marketing and valuation data, retrieving marketing and valuation data from an independent ratings agency, and transmitting said marketing and evaluation data to said prospective buyer.

5. The method of claim 1, wherein the bid terms of a bid to buy the time slot include the time slot identifier and a bid price.

6. The method of claim 1, wherein the time slot criteria include the cost of the time slot per thousand viewers expected to view an advertisement to be shown in the time slot.

7. The method of claim 6, wherein the time slot criteria include at least one geographic region in which an advertisement shown in the time slot is expected to be viewed.

8. The method of claim 6, wherein the time slot criteria include demographic properties of viewers to whom the advertisement to be shown in the time slot is expected to be shown.

9. The method of claim 1, wherein the bid terms include a bid price and the offer terms include an asking price, and the bid terms correspond to the offer terms when the bid price is at least equal to the asking price for the time slot.

10. The method of claim 1, wherein an advertisement supplied by an buyer is to be shown by a seller in the time slot, and further comprising the steps of:

receiving a request message from the buyer to verify that the seller has a copy of the correct advertisement to be shown in the time slot;

sending a query message from the buyer to the seller asking if the seller has a copy of the correct advertisement;

receiving a status message from the seller responsive to said query message, said status message indicating if the seller has a copy of the correct advertisement; and sending a response message to the buyer indicative of the information received from the seller in the status message.

11. The method of claim 10, further comprising the steps of:

if the broadcaster does not have a copy of the advertisement, receiving a copy of the correct advertisement from the advertiser; and sending the copy of the correct advertisement to the broadcaster.

12. The method of claim 11, further comprising the steps of:

verifying that the broadcaster has received the copy of the correct advertisement; and sending a proof of delivery message for the correct advertisement to the advertiser.

13. The method of claim 1, wherein the buyer is an advertiser with an advertisement, and further comprising the steps of:

obtaining verification data pertaining to how the advertisement that was intended by the advertiser to be shown in the time slot was actually viewed by its intended audience; and sending the verification data to the advertiser.

14. The method of claim 13, wherein the verification data includes information regarding whether the advertisement was broadcast in the time slot and the quality with which the advertisement was viewed by its intended audience.

15. The method of claim 1, wherein the buyer has a buyer account and the seller has a seller account, and further comprising the steps of:

debiting the buyer account in accordance with the terms of the transaction; and crediting the seller account in accordance with the terms of the transaction.

16. The method of claim 15, further comprising the step of debiting a service fee from the buyer or seller account.

17. The method of claim 1, further comprising the step of creating and storing a historical record of the transaction in computer readable memory.

18. A method for completing a transaction over a network between a buyer and a seller relating to an advertising time slot, comprising the steps of:

receiving a plurality of time slot offer messages over the network from sellers, each said offer message having associated offer terms, a time slot identifier and an ownership field and indicating the owner of each said time slot;

storing data from said offer messages including said ownership fields as time slot offer records in a database;

receiving a non-specific bid message over the network from a buyer with bid terms for said advertising time slot, the bid terms including time slot criteria indicating properties of the advertising time slot;

searching the database and identifying offers with offer terms that correspond to the bid terms of the bid message;

if only one time slot offer is identified that has offer terms that correspond to the bid terms of the bid message, then changing the ownership field in the time slot offer record from the seller to the buyer; and if more than one time slot offer is identified that has offer terms that correspond to the bid terms of the bid message, then displaying time slot offer data from the corresponding time slots to the buyer.

19. The method of claim 18, further comprising the steps of:

receiving a time slot selection message from the buyer that identifies a specific corresponding time slot to purchase;

changing the ownership field in the time slot offer record from the seller to the buyer.

20. An apparatus for completing an advertising time slot transaction over a network, comprising:

a. a time slot exchange server comprising a data bus connecting a processor, computer readable memory storing time slot transaction software, a port to be connected to the network, and a port to be connected to a database; and b. a database connected to said time slot exchange server through said database port, wherein said time slot transaction software is executed on said processor to cause said processor, computer readable memory, data bus, ports and database to cooperate to carry out a time slot transaction and said time slot exchange server creating a bid record from a bid trading message that includes bid terms that include time slot criteria indicating properties of the advertising time slot, and an offer record from an offer trading message that includes a time slot identifier and stores said records in said database as time slot information.

21. A system for completing an advertising time slot transaction between a buyer and a seller over a network, comprising:

a time slot exchange server that receives time slot information comprising time slot offers and bids over the network and completes an advertising time slot transaction between a buyer and a seller;

a database connected to said time slot exchange server that stores time slot information, wherein said time slot exchange server creates a bid record from a bid trading message that includes bid terms that include time slot criteria indicating properties of the advertising time slot, and an offer record from an offer trading message that includes a time slot identifier and stores said records in said database as time slot information.

22. The system of claim 21 wherein said bid record includes a time slot identifier and a bid price.

23. The system of claim 21 wherein said bid record includes time slot viewer demographic criteria and a time slot bid price.

24. The system of claim 21 wherein said time slot information includes the title of a program, the identity of the broadcaster of said program, the time and date on which the program will be broadcast, and the owner of the time slot.

25. The system of claim 21, wherein said time slot exchange server receives time slot marketing and valuation data and stores said time slot marketing and evaluation data in said database.

26. The system of claim 21, wherein said time slot exchange server notifies an advertiser as to whether a broadcaster is in possession of a copy of the advertisement intended by the advertiser to be shown in a time slot.

27. The system of claim 21, wherein said time slot exchange server provides verification data pertaining to how the advertisement that was intended by the advertiser to be shown in the time slot was actually seen.

28. The system of claim 21, wherein the buyer has a buyer account and the seller has a seller account, and wherein said time slot exchange server settles accounts between the time slot seller and buyer by debiting the buyer account and crediting the seller account.

29. The system of claim 28, wherein said time slot exchange server debits a service fee from the buyer account.

30. The system of claim 28, wherein said time slot exchange server debits a service fee from the seller account.

31. A system for completing a time slot transaction over a network, comprising:

means for receiving an offer to sell a time slot with offer terms from the seller that include a time slot identifier;

means for sending time slot offer and marketing and valuation data to at least one buyer;

means for receiving a bid with bid terms from a buyer to purchase a time slot, the bid terms including time slot criteria indicating properties of the advertising time slot;

means for determining if the offer terms of the offered time slot correspond to a particular buyer's bid terms; and means for completing a transaction that transfers the ownership of the corresponding time slot from the seller to the particular buyer.

32. The system of claim 31, further comprising means for notifying the particular buyer as to whether the seller is in possession of an advertisement intended by the particular buyer to be shown in the time slot.

33. The system of claim 31, further comprising means for sending verification data to the particular buyer pertaining to how the advertisement that was intended by the particular buyer to be shown in the time slot was actually viewed by its intended audience.

34. The system of claim 31, further comprising means for settling accounts between the buyer and seller of a time slot.

35. The system of claim 31, further comprising means for storing historical time slot transaction information.

* * * * *